US008457784B2

(12) United States Patent
Rahilly et al.

(10) Patent No.: US 8,457,784 B2
(45) Date of Patent: Jun. 4, 2013

(54) MEMORY WIRE TERMINATOR WITH SPRING CONTACTS

(75) Inventors: Michael Rahilly, Encinitas, CA (US); Frank Dean Weber, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 209 days.

(21) Appl. No.: 13/012,721

(22) Filed: Jan. 24, 2011

(65) Prior Publication Data

US 2012/0191241 A1 Jul. 26, 2012

(51) Int. Cl.
*G06F 17/00* (2006.01)

(52) U.S. Cl.
USPC ............................ 700/242; 221/151; 221/154

(58) Field of Classification Search
USPC ........................... 700/242; 221/151, 152, 154
See application file for complete search history.

(56) References Cited

U.S. PATENT DOCUMENTS

| | | | | |
|---|---|---|---|---|
| 5,883,806 | A * | 3/1999 | Meador et al. | 700/244 |
| 6,011,999 | A * | 1/2000 | Holmes | 700/231 |
| 6,116,461 | A | 9/2000 | Broadfield et al. | |
| 6,338,007 | B1 * | 1/2002 | Broadfield et al. | 700/231 |
| 7,040,504 | B2 | 5/2006 | Broadfield et al. | |
| 7,630,789 | B2 | 12/2009 | Broadfield et al. | |
| 7,775,596 | B2 * | 8/2010 | Kennedy et al. | 297/362.11 |
| 7,840,307 | B2 * | 11/2010 | Mauger et al. | 700/237 |
| 8,019,470 | B2 * | 9/2011 | Meek et al. | 700/237 |
| 2008/0288105 | A1 | 11/2008 | Mauger et al. | |

OTHER PUBLICATIONS

International Search Report and Written Opinion for International Application No. PCT/US2012/022243 dated Sep. 3, 2012.

* cited by examiner

*Primary Examiner* — Timothy Waggoner
(74) *Attorney, Agent, or Firm* — McDermott Will & Emery LLP

(57) ABSTRACT

A container for use in a dispensing system is disclosed. The container comprises a body, a linkage element movably attached to the body, a control module, and an actuator comprising a memory wire having a length and a terminator that is attached to the memory wire. The linkage element has a first position and a second position, and the actuator is mechanically coupled to the linkage element. The control module is attached to the body and comprises a contact element. The terminator is attached to the body and electrically coupled to the contact element, wherein the electrical coupling between the memory wire and the contact element is mechanically compliant such that the position of the terminator relative to the body is invariant when the position of the control module relative to the body varies.

19 Claims, 8 Drawing Sheets

MEMORY WIRE TERMINATOR WITH SPRING CONTACTS

BACKGROUND

1. Field

The present disclosure generally relates to systems and methods for dispensing items and, in particular, systems having individually actuated lidded compartments.

2. Description of the Related Art

Dispensing of medications using Automated Dispensing Machines (ADMs) has become common in hospitals around the world. The benefits include a reduction in the amount of pharmacist labor required to access the medications as well as enabling nurses to obtain the medications faster as many ADMs are located at the nursing stations. ADMs also provide secure storage of medications, particularly controlled substances, as users must typically identify themselves and the patient to whom the medication will be administered before the ADM will allow access to the medication.

One of the challenges of ADMs is providing controlled access in a space-efficient manner. Providing access to a single item, whether in quantity or to only a single dose, reduces the risk that the user might select the incorrect item. Single-dose access is particularly desirable when the item is valuable or has a potential for abuse, such as a controlled substance. Minimizing the volume occupied by the mechanisms of the ADM maximizes the volume available for storage of the items themselves.

The technology of ADMs is applicable to a wide range of non-medical applications, such as dispensing of consumable cutting tools in a machine shop or tracking of tools while working on an aircraft engine where it is critical to ensure that no tool has been left in the engine. Applications where inventory control is a concern or where the identity of the user must be authenticated prior to allowing access to the contents of the storage system are candidates for the use of ADM technology.

Memory wire, also known as "muscle wire", can be made from a range of alloys generally known as "shape memory alloy." Memory wire has been used in a wide variety of applications including medical devices and dispensing technology. Medical devices that incorporate shape memory alloy include stents, specialty guidewires, and laparoscopic surgical sub-assemblies. The Pyxis CUBIE® pockets from CareFusion use a memory wire actuator to release the lid of the pockets as disclosed in U.S. Pat. No. 6,116,461.

SUMMARY

Containers having a memory wire actuator disclosed herein provide an elegant and secure method of dispensing items such as medications. The container may be loaded at a remote location such as a pharmacy and securely transported to the ADM by a non-pharmacist and quickly loaded into the ADM, saving pharmacist time and improving the availability of the ADM to nurses. As a memory wire actuator is small compared to a solenoid and other electric actuators, the container provides single-dose dispensing capability in a space-efficient manner.

A container is disclosed according to certain embodiments. The container comprises a body, a linkage element that is movably attached to the body, a control module that comprises a contact element, and an actuator comprising a memory wire having a length and a terminator that is attached to the memory wire. The linkage element has a first position and a second position. The actuator is mechanically coupled to the linkage element. The control module is attached to the body. The terminator is attached to the body and electrically coupled to the contact element. The electrical coupling between the memory wire and the contact element is mechanically compliant such that variation in the position of the control module relative to the body does not cause variation in the position of the terminator relative to the body.

A container is disclosed according to certain embodiments. The container comprises a body, a linkage element attached to the body, a memory wire having a length, and a biasing element configured to apply a tensile force to the memory wire. The linkage element has a first position and a second position. The memory wire is configured such that a reduction in the length of the memory wire causes the linkage element to move away from the first position towards the second position. The force applied by the biasing element is reduced as the linkage element moves from the first position towards the second position.

A container is disclosed according to certain embodiments. The container comprises a body, a linkage element rotatably attached to the body, the linkage element having a first position and a second position, a sliding element slidably attached to the body along an axis fixed relative to the body, the sliding element coupled to the linkage element, and an actuator comprising a memory wire having a length and a terminator attached to the wire. The actuator is mechanically coupled to the sliding element. The terminator is attached to the body. The memory wire is substantially parallel to the axis of motion of the sliding element. A reduction in the length of the memory wire will cause the linkage element to move from the first position to the second position.

An ADM is disclosed according to certain embodiments. The ADM comprises a container and a dispensing machine. The container comprises a body, a linkage element movably attached to the body, a control module attached to the body, and an actuator comprising a memory wire having a length and a terminator that is attached to the memory wire. The linkage element has a first position and a second position. The actuator is mechanically coupled to the linkage element. The control module comprises a connector and a contact element. The terminator is attached to the body and electrically coupled to the contact element. The electrical coupling between the memory wire and the contact element is mechanically compliant such that motion of the control module does not cause motion of the terminator. The actuator is configured such that a reduction in the length of the memory wire will cause the linkage element to move from the first position to the second position. The control module is configured to accept a control signal through the connector and cause the linkage element to move to the second position in response to the control signal. The dispensing machine comprises a housing, a drawer mounted within the housing, the drawer configured to receive the container, the drawer comprising a docking connector that mates to the connector of the container when the container is received in the drawer assembly, and a processor coupled to the docking connector, the processor configured to transmit the control signal to the container via the docking connector.

A method of dispensing items is disclosed according to certain embodiments. The method comprises the steps of loading at least one item into a container comprising a body having an internal volume with an opening and a lid that is moveably attached to the body and releasably secured over the opening by a linkage element coupled to an actuator that comprises a memory wire, loading the container into a drawer of an automatic dispensing machine (ADM), requesting the item to be accessed from the ADM; and opening the lid of the container that contains the item.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
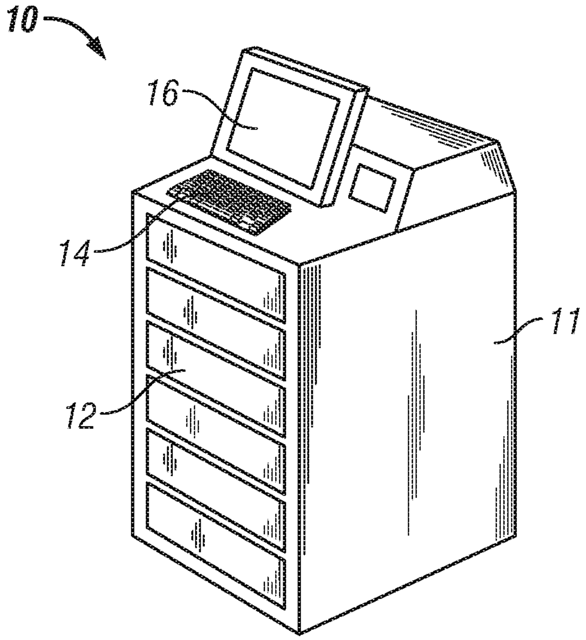
FIG. 1 is a drawing of an ADM for use in medical facilities.

Pharmacists are under increasing pressure to better manage the medications that are provided to nurses and other caregivers in a medical facility. There is an increasing level of regulation, particularly for controlled substances, related to the handling and tracking of medications. Many of these regulations require a pharmacist to perform certain checks on medications, increasing the workload of a pharmacist. Controlled substances, which may include medications listed on Schedules I-V of the Controlled Substances Act, are a particular focus of regulatory requirements for monitoring and control. In addition, many hospitals cannot find pharmacists to fill open positions, placing greater burdens on the pharmacists that are on the hospital staff. There is therefore a need to manage medications with a reduced amount of pharmacist time.

Memory wire actuators are well suited to use in small dispensing systems. The memory wire actuators are small compared to alternate actuators such as solenoids and motors, and simple to operate. A common method of energizing a memory wire actuator is to pass a current through the memory wire. The energy dissipated by the electrical resistance of the memory wire heats the wire and induces the phase change that causes the memory wire to contract. Removal of current allows the memory wire to expand to its original length. Current applications of memory wire actuators have a number of challenges including low output force, low actuation travel, and sensitivity to tolerances in the installation.

Memory wire is sensitive to the conditions under which it is used. To achieve the full potential force, travel, and cycle life of the memory wire requires careful attention to, among other factors, the type of motion and preload force. Bending of the memory wire during an operational cycle may lead to early failure of the memory wire. Existing memory wire actuators that are used as part of a mechanism are terminated to printed circuit board assemblies (PCBAs). The PCBAs are then attached to the same structure to which the other elements of the mechanism are attached, adding tolerances in the relative positioning of the PCBA to the elements of the mechanism. If multiple memory wire actuators are attached to a single PCBA, the system is further constrained resulting in additional tolerances added to multiple parts of the mechanism. Existing memory wire designs frequently are configured to induce bending of the memory wire as it contracts, resulting in fatigue and a reduced operational life. In addition, the tension applied to the memory wire over the operational stroke of actuation can vary significantly, varying from a zero-tension condition to conditions where the preload consumes most of the available actuation force of the memory wire.

The disclosed container and ADM provide a reliable and secure system and method of storing and dispensing items especially medications. Certain exemplary embodiments of the present disclosure include a container having an actuator that comprises a memory wire and a terminator, wherein the terminator is attached to the body of the container rather than the drive electronics.

While the discussion of the system and method is directed to the dispensing of medications in a hospital, the disclosed methods and apparatus are applicable to dispensing of medications in other environments as well as the dispensing of other types of items in a variety of fields. For example, machine shops frequently have a tool crib staffed by an individual to provide cutters, drills, and other consumable supplies to the machinists without providing uncontrolled access to the stock of tools and parts. An ADM may be stocked with these consumables and used in place of the tool crib to provide these items to the machinists in a controlled and traceable manner. Similarly, items such as an expensive specialty tool may be removed by an individual for use and returned to the same compartment after use, enabling the tool to be tracked and making a single tool available to multiple people.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

FIG. 1 is a drawing of an ADM for use in medical facilities. This example ADM 10 includes a plurality of drawers 12, some of which may be configured to receive dispensing cartridges (not shown). This configuration of an ADM 10 is often referred to as a cabinet, which includes a housing 11, multiple drawers 12, a variety of electronics and controls (not shown), and the user interface. The user interface of the ADM 10 includes a display 16 and a keyboard 14 so that a user, such as a nurse, may identify which medication they wish to remove from the ADM 10. The embodiments of the present disclosure may be employed with an otherwise conventional ADM 10, with a change in the drawer configuration.

Figure 2:
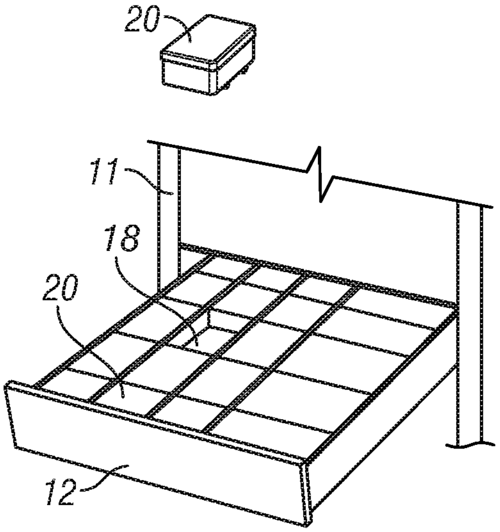
FIG. 2 illustrates a drawer of an ADM configured to accept secure lidded containers according to certain embodiments of the present disclosure.

FIG. 2 illustrates a drawer of an ADM configured to accept secure lidded containers according to certain embodiments of the present disclosure. The drawer 12 is shown installed in housing 11. A container 20 is shown separate from the drawer 12, wherein the space 18 is configured to accept container 20. Other containers 20 of various sizes are shown installed in drawer 12.

Figure 3:
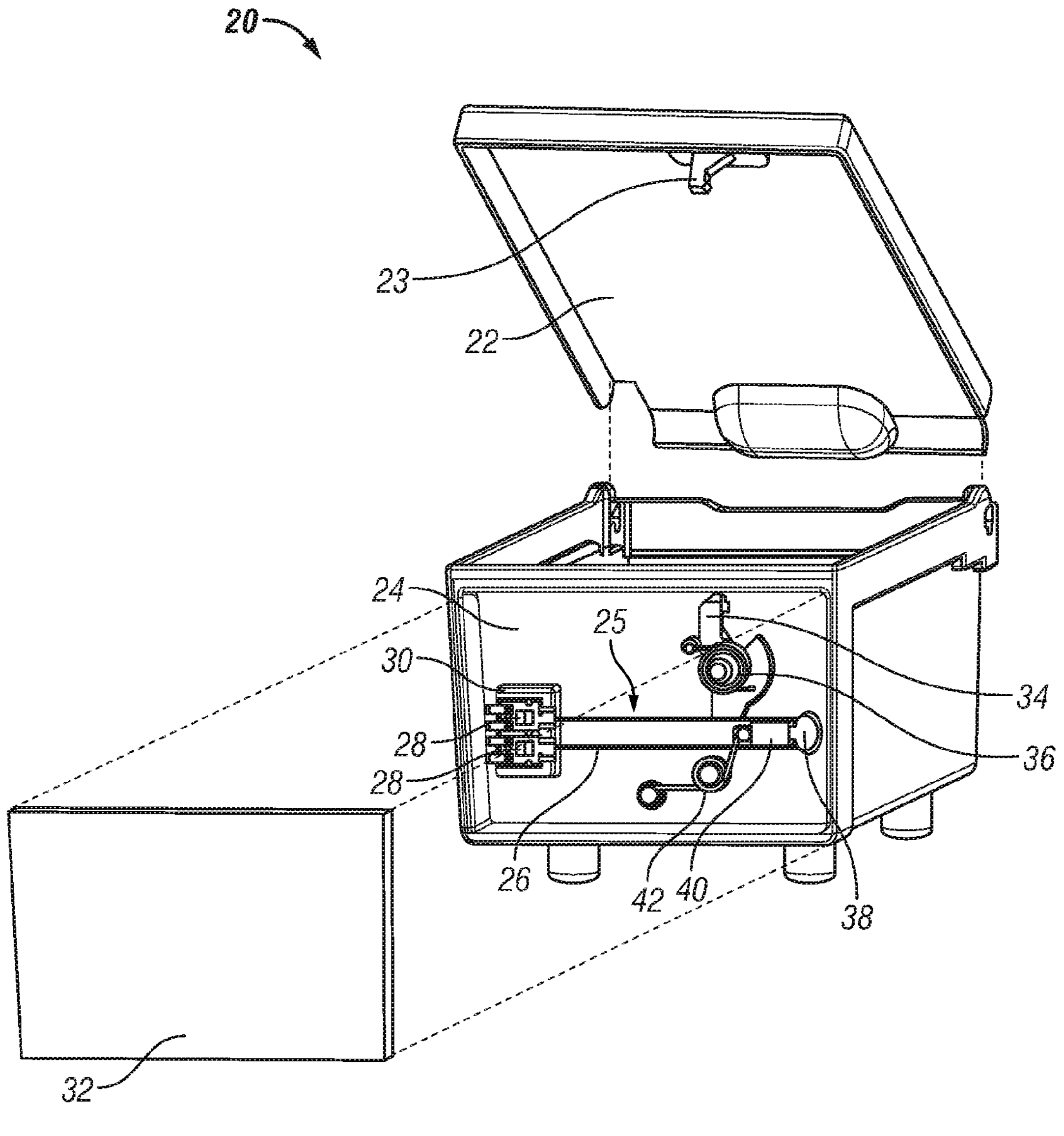
FIG. 3 depicts an example configuration of the internal construction of a secure lidded container according to certain embodiments of the present disclosure.

FIG. 3 depicts an example configuration of the internal construction of a secure lidded container 20 according to certain embodiments of the present disclosure. Container 20 comprises a body 24 with a lid 22 that, in this example, is hingedly attached to the body 24. Lid 22 includes a fastening element that, in this example, is a hook 23. When lid 22 is closed, hook 23 protrudes downward and is engaged by linkage element 34 that, in this example, is a latch. Torsion spring 36 applies a counterclockwise torque, in this example, to linkage element 34 that rotates linkage element 34 towards the closed position wherein the tip of linkage element 34 engages the hook 23 and keeps lid 22 closed and secured.

Container 20 also includes a sliding element 38 that engages linkage element 34 such that a right-to-left movement of sliding element 38 will, in this example, cause a clockwise rotation of linkage element 34 thereby releasing the hook 23. Sliding element 38 is attached to body 24 by sleeve 40 which constrains sliding element 38 to move only along a single axis that, in this example, is horizontal and parallel to the front face of the body 24.

Actuator 25 comprises a memory wire 26 that wraps around a portion of sliding element 38 and is terminated at each end by a terminator 28. In this example, the lengths of memory wire 26 between the sliding element 38 and the respective terminators 28 are approximately parallel to the direction of motion of sliding element 38 such that contraction of the memory wire 26 does not cause a bending of the memory wire between the terminators 28 and the sliding element 38. A second biasing element 42 is attached to the body 24 and applies a force to sliding element 38 in the direction that places the memory wire 26 in tension. It is desirable to maintain memory wire 26 in tension over the entire cycle of operation to provide the maximum operational life.

Memory wire, also know as muscle wire, is made from a shape memory alloy (SMA). The three main types of shape memory alloys are the copper-zinc-aluminum-nickel, copper-aluminum-nickel, and nickel-titanium (NiTi) alloys although SMAs can also be created by alloying zinc, copper, gold, and iron. NiTi alloys are generally more expensive and change from austenite to martensite upon cooling. The transition from the martensite phase to the austenite phase is only dependent on temperature and stress, not time as most phase changes are, as there is no diffusion involved. It is the reversible diffusionless transition between these two phases that allow the special properties to arise. Use of memory wire as an actuator is very space efficient.

Heating of the memory wire 26 is induced, in this example, by passing electrical current through the memory wire 26 itself The container 20 includes a control module 32 that, in this example, is a PCBA. The control module 32 controls the flow of current through the memory wire 26. The terminators 28 are mechanically captured in a socket 30 that is part of body 24 while the electrical connection between terminators 28 and control module 32 is accomplished through spring elements that are part of the terminators and which will be discussed in more detail below. The control module 32 is attached to the body 24 and a cover (not shown) is attached over the control module 32 to protect the control module 32 and the other components.

Memory wire will typically exhibit a length change of under 5% when heated. Because this working motion is so small, it is important to minimize tolerances in the assembly of the actuator and the mechanism to which the actuator is coupled. for example, a one-inch length of memory wire will only produce 0.050 inches of motion. This working range would be effectively eliminated if there are five +/−0.005 tolerances between the terminators of the memory wire and the portion of the mechanism to which the memory wire actuator is attached. In the example similar to that of FIG. 3, if the terminators 28 are mechanically attached to PCBA 32, and PCBA 32 is then attached to the body 24 of the container 20, at least three tolerances (terminator attach point to mounting hole on the PCBA 32, variation in the mounting hole, and position of the mounting hole to the attachment point on the body 24). Thus, the direct and fixed attachment of the terminators 28 to the body 24 reduces the total variation between the actuator 25 and linkage element 34, increasing the stroke and force available to secure and release the lid 22.

In operation, container 20 is placed in drawer 12 as shown in FIG. 2, whereupon a control signal and power connection are made between the control module 32 and the electronics of the ADM 10. When it is desired to provide access to the contents of container 10, a signal is transmitted from the electronics of ADM 10 to the control module 32, which then causes electrical current to pass through the memory wire 26. As the temperature of the memory wire 26 increases, the length of the memory wire 26 is decreased. This decrease causes the sliding element 38 to move to the left, which in turn pushes on the lower portion of linkage element 34 causing linkage element 34 to rotate clockwise. At some point, the linkage element will release hook 23 and lid 22 is free to open. Upon receipt of a signal that the lid is open or after a fixed amount of time, the control module 32 will stop the current from flowing through memory wire 26, causing the memory wire 26 to cool and therefore increase in length. As the length of memory wire 26 increases, biasing elements 42 and 36 will take up the slack and cause sliding element 38 and linkage element 34 to return to their original positions.

Figure 4A:
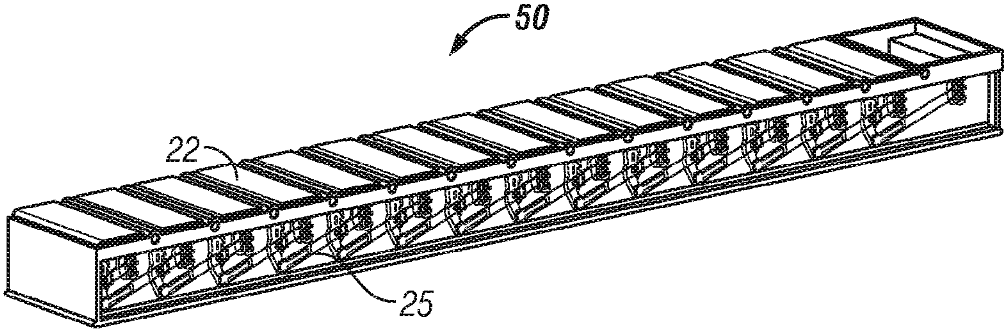
FIG. 4A depict a partially exposed perspective view of a multi-lidded cartridge having individual actuators according to certain embodiments of the present disclosure.

FIG. 4A depict a partially exposed perspective view of a multi-lidded cartridge 50 having individual actuators according to certain embodiments of the present disclosure Cartridge 50 has multiple bins, each bin having a lid 22. In this example, each lid is associated with an individual memory wire actuator 25.

Figure 4B:
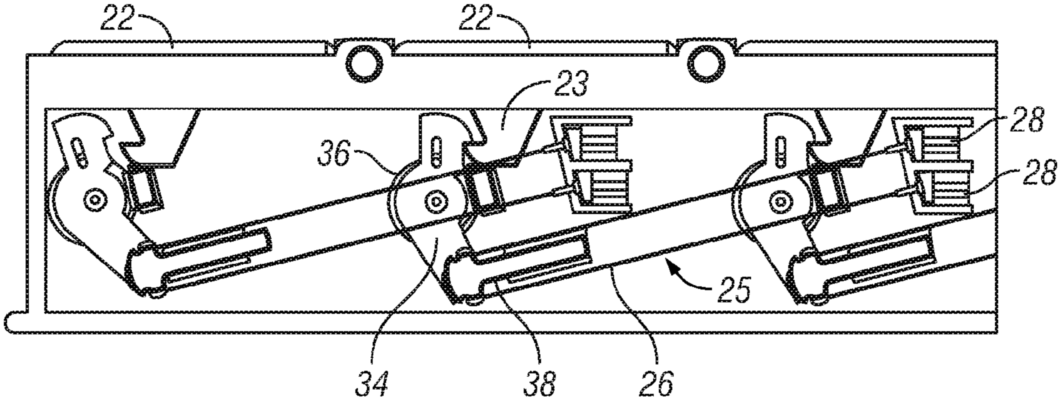
FIG. 4B depicts an enlarged and partially exposed side view of a portion of the cartridge of FIG. 4A according to certain embodiments of the present disclosure.

FIG. 4B depicts an enlarged side view of a portion of the cartridge of FIG. 4A according to certain embodiments of the present disclosure. In this configuration of cartridge 50, terminators 28 are attached to the memory wire 26 at an angle to the memory wires 26. This angled attachment enables a more compact arrangement of the various components of container 50. The linkage element 34 and sliding element 38 are substantially similar to the embodiment of FIG. 3, although sleeve 40 has been omitted for clarity in FIG. 4B. The mechanism sets are overlapped between adjacent bins to allow the use of a longer memory wire 26 than would be possible if the length of memory wire 26 were restricted to the length of a single bin. A longer memory wire 26 may provide a higher actuation force, a greater range of motion, or a longer operational life, depending on the specific design.

Figure 5:
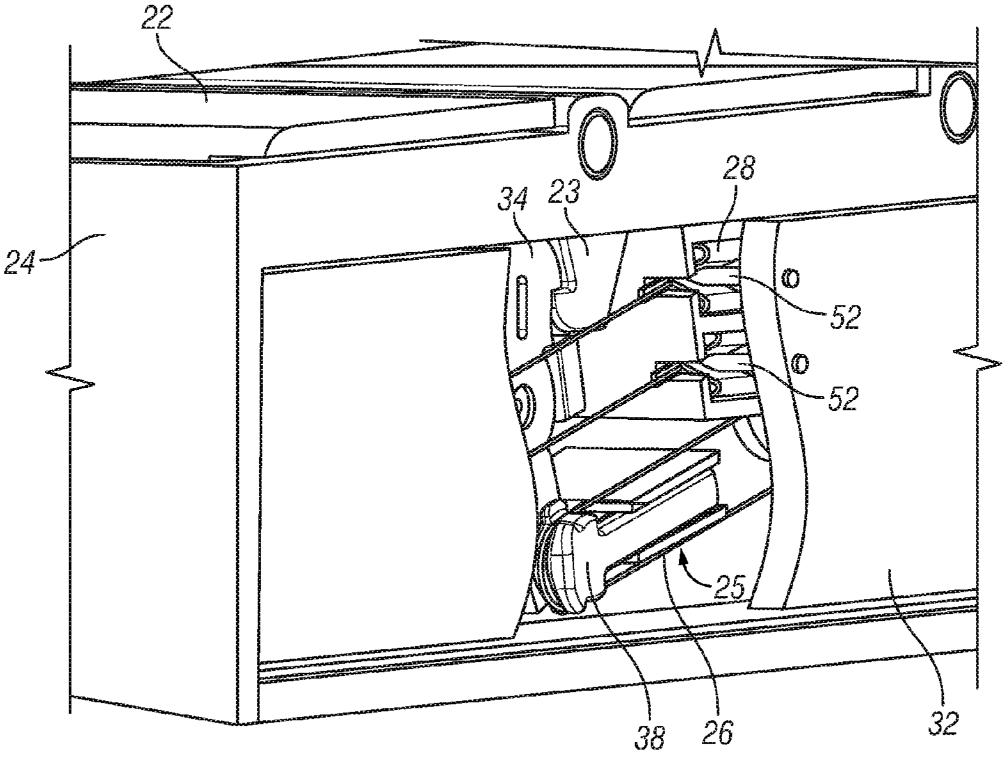
FIG. 5 depicts a partially exposed view of an example configuration of a memory wire actuator installed in a secure lidded container, illustrating the compliant coupling between the actuator termination that is fixedly attached to the body of the container and a mating post contact element of the control module according to certain embodiments of the present disclosure.

FIG. 5 illustrates an example configuration of the memory wire terminator 28 and the mating contact element 52 of the control module 32 according to certain embodiments of the present disclosure. In this perspective view of the side of cartridge 50, a portion of control module 32 has been cut away to show the connection between actuator 25 and control module 32. Control module 32 has two pins that form the contact elements 52. As can be seen in FIG. 5, these contact elements are forced between the spring elements of terminators 28 when the control module 32 is mounted over the mechanism and attached to body 24.

Figure 6A:
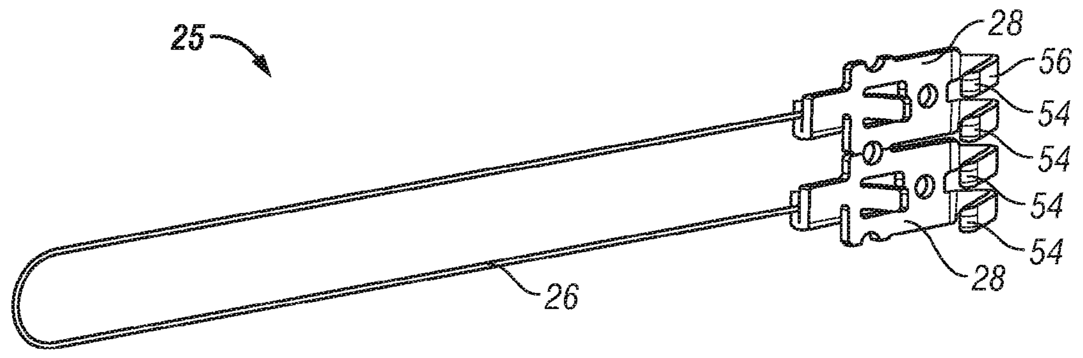
FIG. 6A illustrates an example configuration of a memory wire actuator according to certain embodiments of the present disclosure.

FIG. 6A illustrates an example configuration of a memory wire actuator 25 according to certain embodiments of the present disclosure. It can be seen that, in this example, terminators 28 are crimped onto each end of memory wire 26. Each terminator 28 includes two terminal pads 54 located on conductive elastic elements 56 that are mechanically compliant in a direction perpendicular to the plane of the main portion of terminator 28.

Figure 6B:
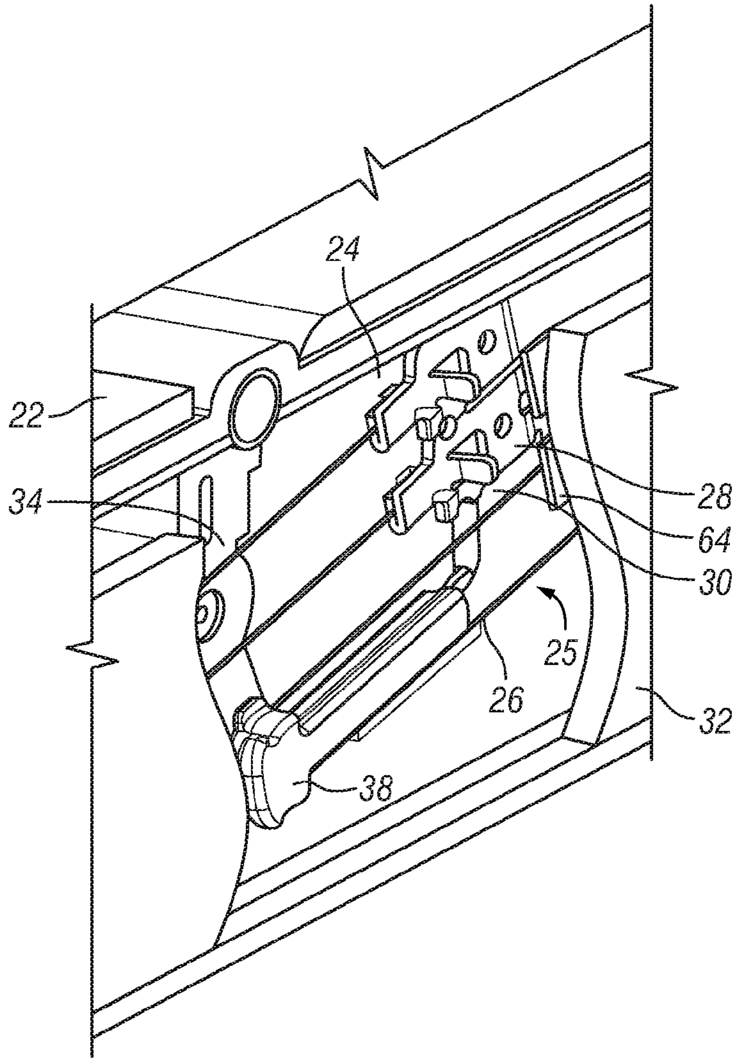
FIG. 6B depicts a partially exposed view of the memory wire actuator of FIG. 6A installed in a secure lidded container, illustrating the compliant coupling between the actuator termination that is fixedly attached to the body of the container and a flat mating contact element of the control module according to certain embodiments of the present disclosure.

FIG. 6B depicts a partially exposed view of the memory wire actuator 25 of FIG. 6A installed in a secure lidded container, illustrating the compliant coupling between the actuator terminator 28 that is fixedly attached to the body 24 of the container and a flat mating contact element 56 of the control module 32 according to certain embodiments of the present disclosure. The main portions of terminators 28 are mechanically captured in socket 30 on the body 24. This direct and fixed attachment of the terminators 28 to the body 24 of the container reduces the variation in the position of the memory wire actuator 25 relative to the other elements of the release mechanism to which the memory wire actuator 25 is coupled. The electrical connection between the memory wire 26 and control module 32 is established when control module 32 is attached to body 24. The contact pads 64, which are flat plated areas on the surface of control module 32 that are visible at the edge of the cut-away area, contact the terminal pads 54 and deform the conductive elastic elements 56. The stress induced by the deformation of elastic conductive elements 56 creates contact force between the terminal pads 54 and the contacts pads 64 on control module 32. The position of terminators 28 is invariant when the position of control module 32 varies due to manufacturing and assembly tolerances.

Figure 7A:
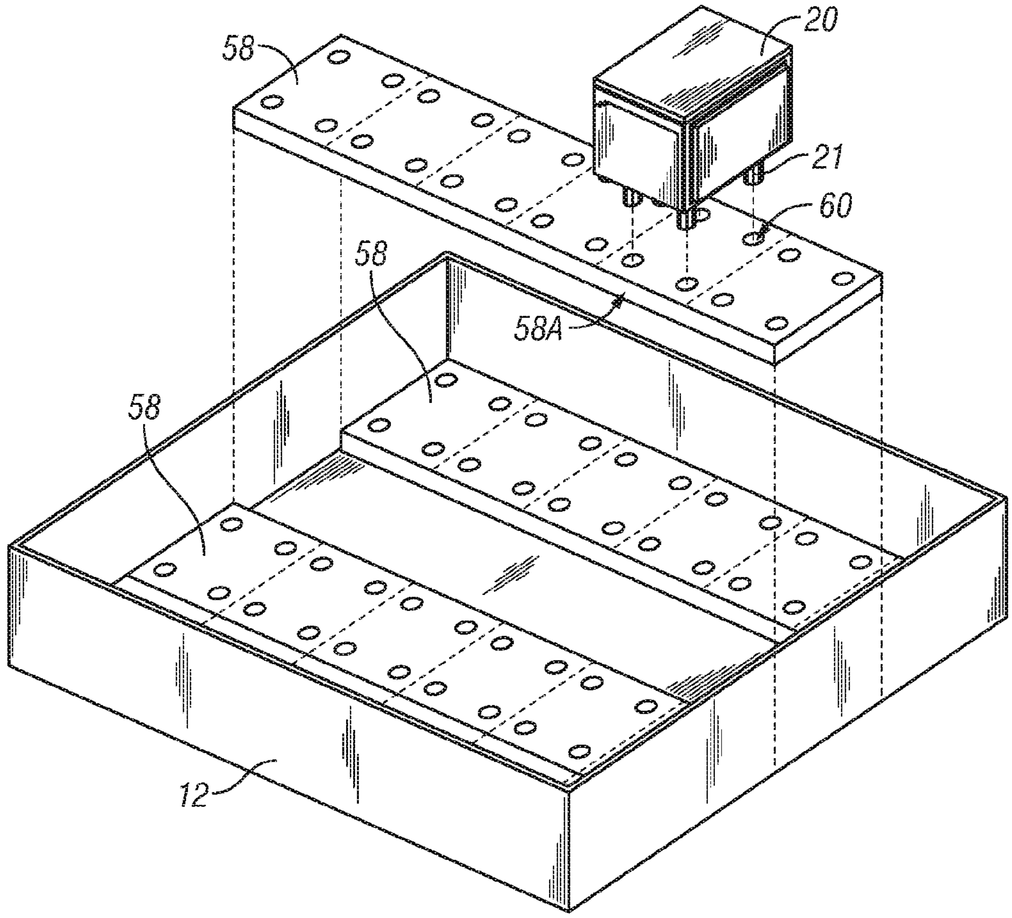
FIGS. 7A-7B illustrate an example configuration of a memory wire actuator 25 used to retain a cartridge 20 of the type shown in FIG. 3 in a drawer 12 according to certain embodiments of the present disclosure.
Figure 7B:
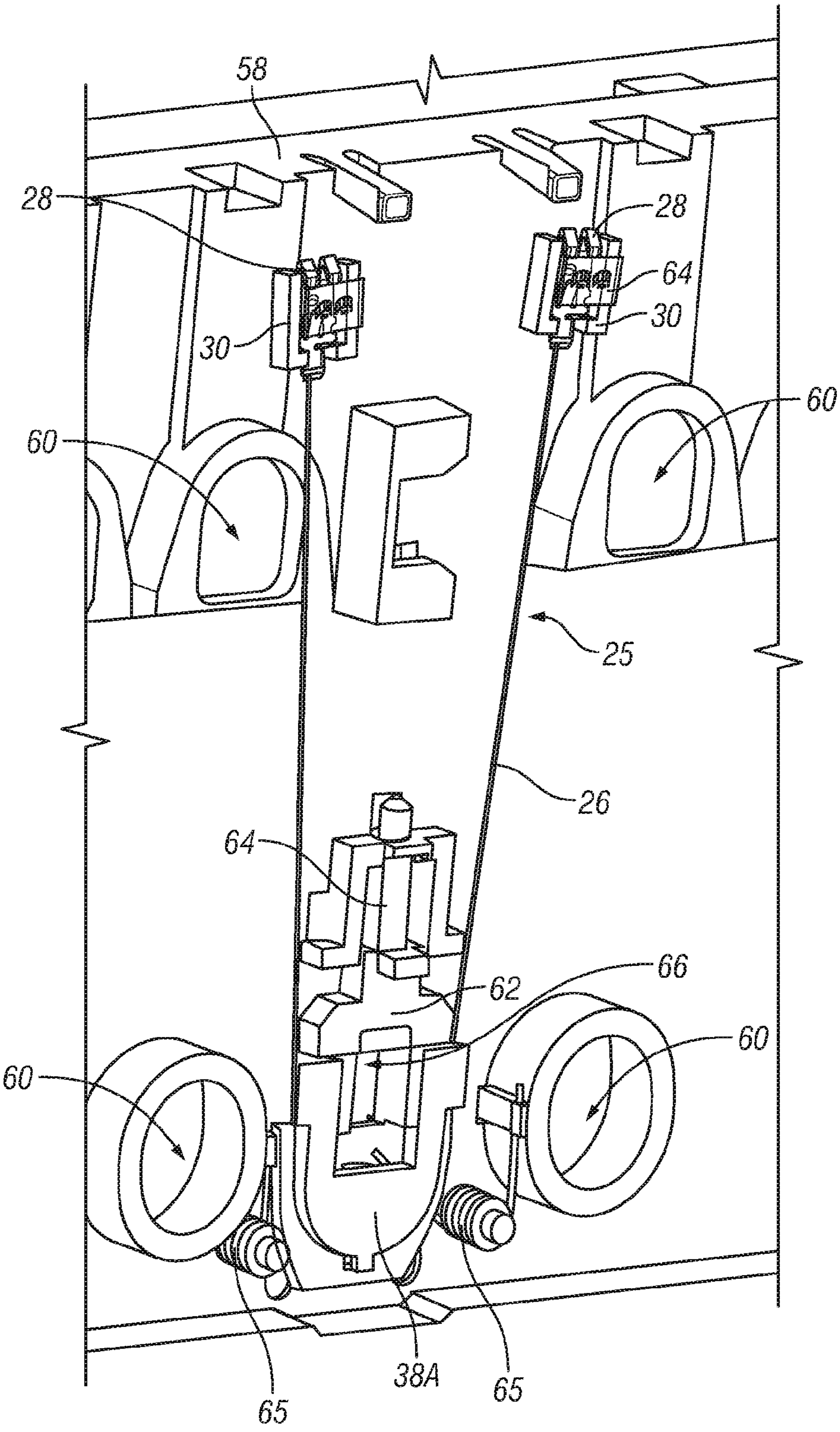

FIGS. 7A-7B illustrate an example configuration of a memory wire actuator 25 used to retain a cartridge 20 of the type shown in FIG. 3 in a drawer 12 according to certain embodiments of the present disclosure. FIG. 7A depicts a drawer 12 having a plurality of trays 58 lining the bottom interior. These trays are configured with holes 60 (shown only for the position 58A corresponding to the cartridge 20 for clarity) that are configured to accept legs 21 of cartridge 20. FIG. 7B is a view of the underside of position 58A of tray 58 from FIG. 7A. The four holes 60 accept the four legs 21 (not shown) to align the cartridge 20 (not shown) with the position 58A. A latch 62 engages the retention feature (not shown) of cartridge 20 when in place. Memory metal actuator 25 is attached to the tray 58, wherein the terminators 28 are secured in sockets 30 similar to the configuration shown in FIG. 3. The memory wire 26 wraps around a sliding element 38 similar to that of FIG. 6, wherein contraction of the memory wire 26 will pull the sliding element 38 upwards, in the orientation of this view, pushing latch 62 upwards and releasing the retention feature of cartridge 20. Spring element 64 provides a downward force, in the orientation of this view, to return the latch to the engaged position. In this embodiment, additional spring elements 65 provide a downward force on sliding element 38A independent of spring element 64. This enables latch 62 to slide upward, in the orientation of this view, when the retention feature of cartridge 20 is introduced through hole 66 without releasing the tension on memory wire 26. A PCBA (removed for clarity) covers this area, wherein the position of contact pads 64 are shown in outline for reference. As discussed relative to FIG. 6B, the sliding contact between the terminators 28 and contact pads 64 decouples the position variation of the PCBA from the position of the memory wire actuator 25, reducing the tolerance accumulation and improving the range and force available to actuate the latch 62.

Figure 8:
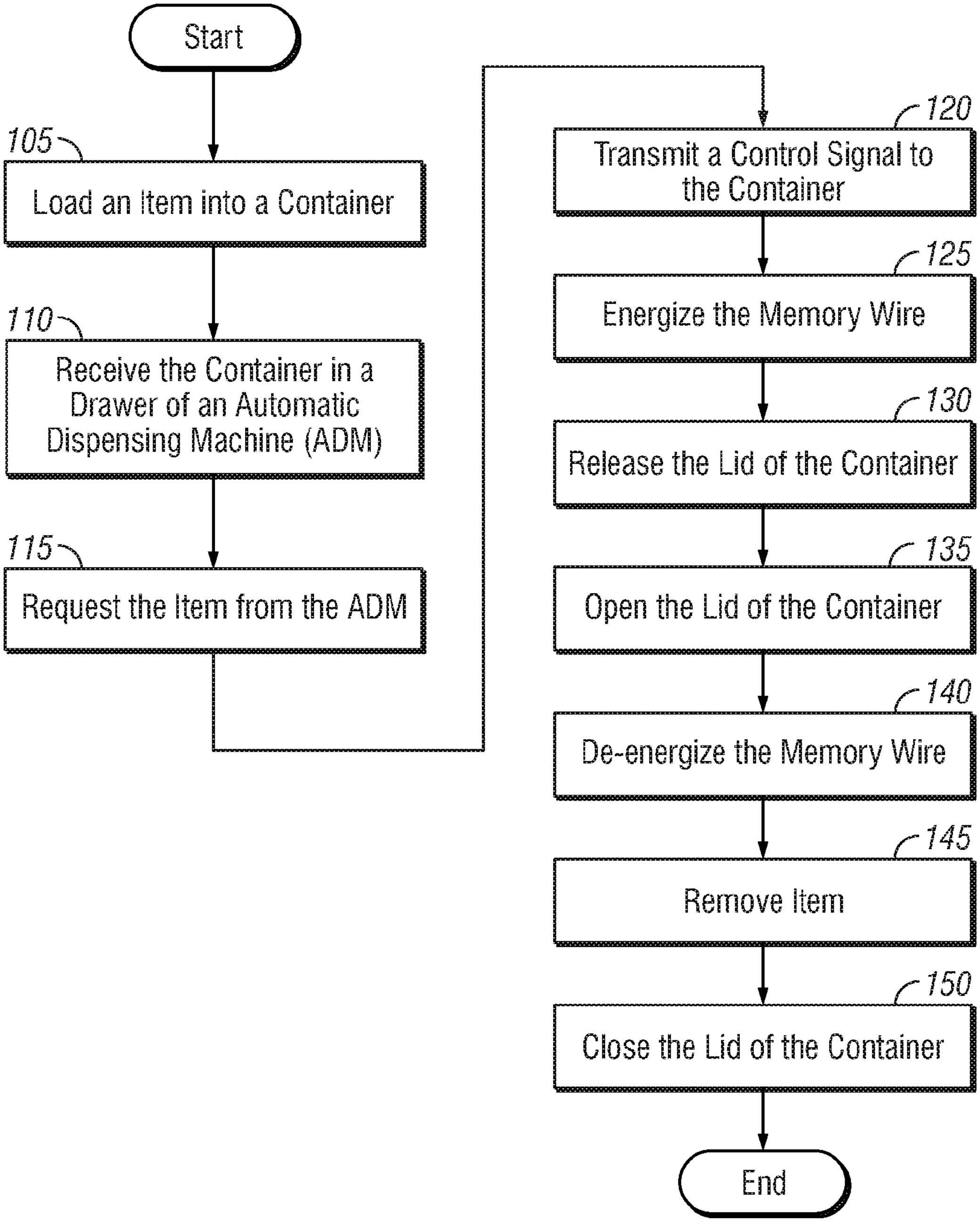
FIG. 8 is a flowchart describing the method of using a container with a memory metal actuator to access an item using an ADM according to certain embodiments of the present disclosure.

FIG. 8 is a flowchart describing the method of using a container 20 with a memory metal actuator 25 to access an item using an ADM 10 according to certain embodiments of the present disclosure. In step 105, the item is loaded into a container 20 having a body 24 with an internal volume and a lid 22 movably attached and releasably secured over the opening of the internal volume, wherein the lid 22 is secured by a linkage element 34 coupled to a memory wire actuator 25 having a terminator 28 that is attached to the body 24 of the container 20. Container 20 of FIG. 3 is an example of such a container. In step 110, this container 20 is transported to an ADM 10 and loaded into a drawer 12 that is configured to receive the container 20. In step 115, a user who desires to remove the item comes to the ADM 10 and requests the item. In a hospital environment, this request may include identification of the user, identification of the patient, and other safety checks and protocols that are known to those of skill in the art. Upon the satisfactory completion of the request process, the ADM 10 transmits a control signal to the container 20 in step 120 to open the lid 22 of the container 20. The container 20 will energize the memory wire 26 in the memory wire actuator 25 by, in this example, passing electric current through the memory wire 26. This causes the memory wire 26 to shrink, reducing the length of the memory wire 26 and exerting a force on the linkage element 34 to which the memory wire actuator 25 is coupled. This force causes the linkage element 34 to move from a first position, where the linkage element secures lid 22, to a second position, where the linkage element releases lid 22 as shown in step 130. In step 135, the lid 22 is opened, which may be accomplished by either by the user or by a spring. After the lid 22 is opened, the current to the memory wire 26 is stopped, de-energizing the memory wire 26 and allowing the memory wire 26 to expand to its original length and returning the linkage element 34 to its original position. The opening of the lid 22 may be detected directly by a sensor or a timer may be used to stop the current after the maximum expected delay time for the user to open the lid 22. In step 145, the user removes the item and, in step 150, closes lid 22.

It can be seen that the disclosed embodiments of memory wire actuator provide an elegant and space-efficient actuation system that is particularly suited for controlled dispensing of items. Attachment of the memory wire terminators to the body of the container while providing compliant electrical connection to the control module eliminates several sources of variation in the construction of an actuation mechanism, increasing the available force and stroke of the actuator while also improving the operational life. Reduction in the bending of the memory wire during operation also will improve the operational life of the actuator.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

While the disclosed configuration of an ADM has been directed to a drawer into which a container is placed, this same technique of design can be applied to any actuator that comprises a memory wire. The drawer may be replaced by a flat mounting surface, a portable attachment surface, or other operationally equivalent surfaces that provide for a power and communication connection to the container. This same method of terminating and attaching memory wires may also be employed in a battery-powered system that communicate wirelessly such that the container is fully functional while unconnected.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A container, comprising:

a body;

a linkage element movably attached to the body, the linkage element having a first position and a second position;

a control module comprising a contact element, the control module attached to the body; and an actuator comprising a memory wire having a length and a terminator that is attached to the memory wire, the actuator mechanically coupled to the linkage element, wherein the terminator is attached to the body and comprises a conductive elastic element that is electrically coupled between the memory wire and the contact element, wherein the electrical coupling between the memory wire and the contact element is mechanically compliant such that the position of the terminator relative to the body is invariant when the position of the control module relative to the body varies.

2. The container of claim 1 wherein the actuator is configured such that a decrease in the length of the memory wire causes the linkage element to move from the first position to the second position.

3. The container of claim 1 wherein the terminator of the actuator is directly and fixedly attached to the body of the container.

4. The container of claim 1 wherein the end of the memory wire extends beyond the terminator and is electrically bonded to the contact element.

5. The container of claim 1 wherein the conductive elastic element is deformed by the contact element such that there is a contact force between the conductive elastic element and the contact element.

6. The container of claim 5 wherein:

the control module is a printed circuit board assembly (PCBA);

the contact element is an electrical contact pad on the PCBA; and the PCBA is configured such that the PCBA compresses a portion of the conductive elastic element when the PCBA is attached to the body.

7. The container of claim 1 wherein:

the body has an interior volume with an opening;

the container further comprises a lid movably attached to the body, the lid having an attached fastening element; the lid configured to cover the opening; and the linkage element is configured to engage the fastening element of the lid when in the first position and to release the fastening element when in the second position.

8. The container of claim 7 wherein the container comprises a plurality of interior volumes, a plurality of lids, a plurality of linkage elements, and a plurality of actuators, and wherein each interior volume has a respective lid.

9. A container, comprising:

a body;

a linkage element rotatably attached to the body, the linkage element having a first position and a second position;

a sliding element slidably attached to the body along an axis fixed relative to the body, the sliding element coupled to the linkage element; and an actuator comprising a memory wire having a length and a terminator attached to the wire, the actuator mechanically coupled to the sliding element, the terminator attached to the body and comprising a conductive elastic element that is electrically coupled between the memory wire and the contact element, wherein the memory wire is substantially parallel to the axis of motion of the sliding element, and wherein a reduction in the length of the memory wire will cause the linkage element to move from the first position to the second position.

10. The container of claim 9, wherein:

the actuator comprises two terminators attached at opposite ends of the memory wire;

the two terminators are attached to the body adjacent to each other and on a second axis perpendicular to the axis of the sliding element; and the memory wire extends from one terminator to the sliding element, around a portion of the sliding element, and returns to the other terminator such that the portions of the memory wire between each terminator and the sliding element are substantially parallel to the axis of motion of the sliding element.

11. The container of claim 9 wherein:

the body has an interior volume with an opening;

the container further comprises a lid movably attached to the body, the lid having an attached fastening element; the lid configured to cover the opening; and the linkage element is configured to engage the fastening element of the lid when in the first position and to release the fastening element when in the second position.

12. The container of claim 11 wherein the container comprises a plurality of interior volumes, a plurality of lids, a plurality of linkage elements, and a plurality of actuators, and wherein each interior volume has a respective lid.

13. The container of claim 9 wherein the terminator of the actuator is directly and fixedly attached to the body of the container.

14. An automated dispensing machine (ADM) comprising:

a container comprising:

a body;

a linkage element movably attached to the body, the linkage element having a first position and a second position;

a control module comprising a connector and a contact element, the control module attached to the body; and an actuator comprising a memory wire having a length and a terminator that is attached to the memory wire, the actuator mechanically coupled to the linkage element, wherein the terminator is attached to the body and comprises a conductive elastic element that is electrically coupled between the memory wire and the contact element, wherein the electrical coupling between the memory wire and the contact element is mechanically compliant such that motion of the control module does not cause motion of the terminator, and wherein the actuator is configured such that a reduction in the length of the memory wire will cause the linkage element to move from the first position to the second position;

wherein the control module is configured to accept a control signal through the connector and cause the linkage element to move to the second position in response to the control signal;

a dispensing machine housing;

a drawer mounted within the dispensing machine housing, the drawer configured to receive the container, the drawer comprising a docking connector that mates to the connector of the container when the container is received in the drawer assembly, and a processor coupled to the docking connector, the processor configured to transmit the control signal to the container via the docking connector.

15. The ADM of claim 14 wherein the terminator of the actuator is directly and fixedly attached to the body of the container.

16. The ADM of claim 14 wherein:

the body of the container comprises an interior volume with an opening;

the container further comprises a lid movably attached to the body, the lid having an attached fastening element; the lid configured to cover the opening; and the linkage element is configured to engage the fastening element of the lid when in the first position and to release the fastening element when in the second position.

17. The ADM of claim 16 wherein the container further comprises a plurality of interior volumes, a plurality of lids, a plurality of linkage elements, and a plurality of actuators, and wherein each interior volume has a respective lid.

18. A method of dispensing items, the method comprising the steps of:

loading at least one item into a container comprising a body having an internal volume with an opening and a lid that is moveably attached to the body and releasably secured over the opening by a linkage element coupled to an actuator that comprises a memory wire and a terminator, wherein the terminator is directly and fixedly attached to the body and comprises a conductive elastic element that is electrically coupled between the memory wire and the contact element, wherein the electrical coupling between the memory wire and the contact element is mechanically compliant such that the position of the terminator relative to the body is invariant when the position of the control module relative to the body varies;

receiving the container into a drawer of an automatic dispensing machine (ADM);

requesting the item to be accessed from the ADM;

transmitting a signal to open the lid from the ADM to the container; and opening the lid of the container that contains the item.

19. The method of claim 16, further comprising the steps of:

energizing the memory wire of the actuator, wherein the actuator is coupled to the linkage element, thereby causing the memory wire to shorten and apply a force to the linkage element, thereby causing the linkage element to move from a first position to a second position, wherein the linkage element in the first position secures the lid and in the second position releases the lid;

releasing the lid thereby allowing the lid to be opened; and de-energizing the memory wire.

* * * * *